United States Patent
Buchhop et al.

(10) Patent No.: US 8,583,752 B2
(45) Date of Patent: Nov. 12, 2013

(54) WIRELESS DATA DEVICE WITH CONFIRMATION AND RETRY CAPABILITIES FOR PUSHED DATA

(75) Inventors: Peter K. Buchhop, Cary, IL (US); Anne B. Fyk, Highland Park, IL (US)

(73) Assignee: Bank of America Corporation, Charlotte, NC (US)

(*) Notice: Subject to any disclaimer, the term of this patent is extended or adjusted under 35 U.S.C. 154(b) by 673 days.

(21) Appl. No.: 10/907,224

(22) Filed: Mar. 24, 2005

(65) Prior Publication Data

US 2006/0218237 A1    Sep. 28, 2006

(51) Int. Cl.
*G06F 15/16* (2006.01)

(52) U.S. Cl.
USPC ........................................................ 709/207

(58) Field of Classification Search
USPC ........................................................ 709/207
See application file for complete search history.

(56) References Cited

U.S. PATENT DOCUMENTS

| | | | |
|---|---|---|---|
| 6,535,855 B1 | 3/2003 | Cahill et al. | |
| 2002/0065074 A1 | 5/2002 | Cohn et al. | |
| 2003/0084108 A1* | 5/2003 | Syed | 709/206 |
| 2003/0093476 A1* | 5/2003 | Syed | 709/204 |
| 2004/0054598 A1* | 3/2004 | Kall et al. | 705/26 |
| 2004/0158619 A1* | 8/2004 | Pedersen et al. | 709/219 |
| 2004/0205233 A1* | 10/2004 | Dunk | 709/238 |
| 2004/0259553 A1* | 12/2004 | Delaney et al. | 455/445 |
| 2005/0009517 A1* | 1/2005 | Maes | 455/432.1 |
| 2005/0149618 A1* | 7/2005 | Cheng | 709/206 |

FOREIGN PATENT DOCUMENTS

WO    0175684    10/2001

OTHER PUBLICATIONS

William R. Stanek, Microsoft IIS 6.0: Administrator's Pocket Consultant, Apr. 2, 2001, Microsoft Press, pp. 1-6.*
Push Access Protocol, Version Apr. 29, 2001; 1999-2001, Wireless Application Protocol Forum, Ltd. (http://www.wapforum.org/what/copyright.htm).
Neomar Microbrowser 3.5 with Intelligent Client Engine, User's Guide for RIM Wireless Handhelds; Neomar, Inc., San Francisco, CA., Copyright 2002.
Supplementary European Search Report in EP 06748688 dated Apr. 17, 2012.
International Search Report and Written Opinion in PCT/US06/10909 dated Jun. 13, 2007.
Communication in EP 06748688 dated May 21, 2012.
Office Action in CA 2,603,050 dated Feb. 19, 2013.

* cited by examiner

*Primary Examiner* — Ryan Jakovac
(74) *Attorney, Agent, or Firm* — Banner & Witcoff, Ltd.; Michael A. Springs

(57) ABSTRACT

A system for transmitting pushed data to a wireless data device generates a tracking identifier for a request for the pushed data and sends the request to a wireless data device server. The request includes the tracking ID and the wireless data device server includes a log file. The system parses the log file to extract confirmation data and determines whether the pushed data was successfully delivered based on the confirmation data. If the pushed data was not successfully delivered, the system will send a additional request for the pushed data to the wireless data device server.

24 Claims, 3 Drawing Sheets

WIRELESS DATA DEVICE WITH CONFIRMATION AND RETRY CAPABILITIES FOR PUSHED DATA

FIELD OF THE INVENTION

One embodiment of the present invention is directed to wireless data devices. More particularly, one embodiment of the present invention is directed to confirmation and retry of pushed data delivery to wireless data devices.

BACKGROUND INFORMATION

Wireless data devices have proliferated in recent years. The popularity of these devices is based on their ability to receive e-mail and other data remotely so that the user can always be "in touch" with the office.

Many of these devices have a "push" architecture that eliminates the hassles of the traditional "pull" devices, in which the user must periodically connect to an e-mail server to check for new messages, or click on an embedded Web link to receive data. In contrast, with a push device, e-mail messages and other data such as documents are automatically routed to the handheld device, without the active participation of the user.

All wireless data devices are susceptible to failure of data delivery. A pushed document may fail to be delivered to a device for a number of reasons. For example, the device may be out of coverage, turned off, and the like. However, there are many situations where it is very important that the pushed content successfully reaches a wireless data device. For example, some organizations send out an emergency contact list that is frequently updated. The purpose of the emergency contact list is to enable key people to be contacted in the event of disaster or emergency, so it is very important for this document to be delivered to the wireless devices in a reliable manner.

Known wireless data devices do not include an automated method for determining whether pushed data was successfully delivered to the device. In some devices, determining that the delivery was unsuccessful is complex and involves waiting until a flow control timeout period (typically ten minutes) has expired for the request.

Consequently, known wireless data devices also do not have functionality to automatically resend pushed data that was not successfully delivered to the device. In known devices, retrying the sending of pushed data has to be done manually by determining the list of devices for which the delivery was unsuccessful, reforming the requests for the devices that failed, and using the originating application to resubmit the requests for each of these devices. Multiple failures require this procedure to be repeated many times, which results in an arduous process that is prone to error.

Based on the foregoing, there is a need for a system and method for automatically confirming the delivery of pushed data to wireless data devices and, if necessary, automatically retrying the delivery of the data.

SUMMARY OF THE INVENTION

One embodiment of the present invention is a system for transmitting pushed data to a wireless data device. The system generates a tracking identifier for a request for the pushed data and sends the request to a wireless data device server. The request includes the tracking ID and the wireless data device server includes a log file. The system parses the log file to extract confirmation data and determines whether the pushed data was successfully delivered based on the confirmation data. If the pushed data was not successfully delivered, the system will send a additional request for the pushed data to the wireless data device server.

DETAILED DESCRIPTION

One embodiment of the present invention is a wireless data device system that automatically confirms when pushed data has been successfully delivered to the wireless data device. Another embodiment automatically retries the delivery of the data until the data has been successfully delivered. As a result, the reliability of the system is improved without the need for user intervention.

Figure 1:
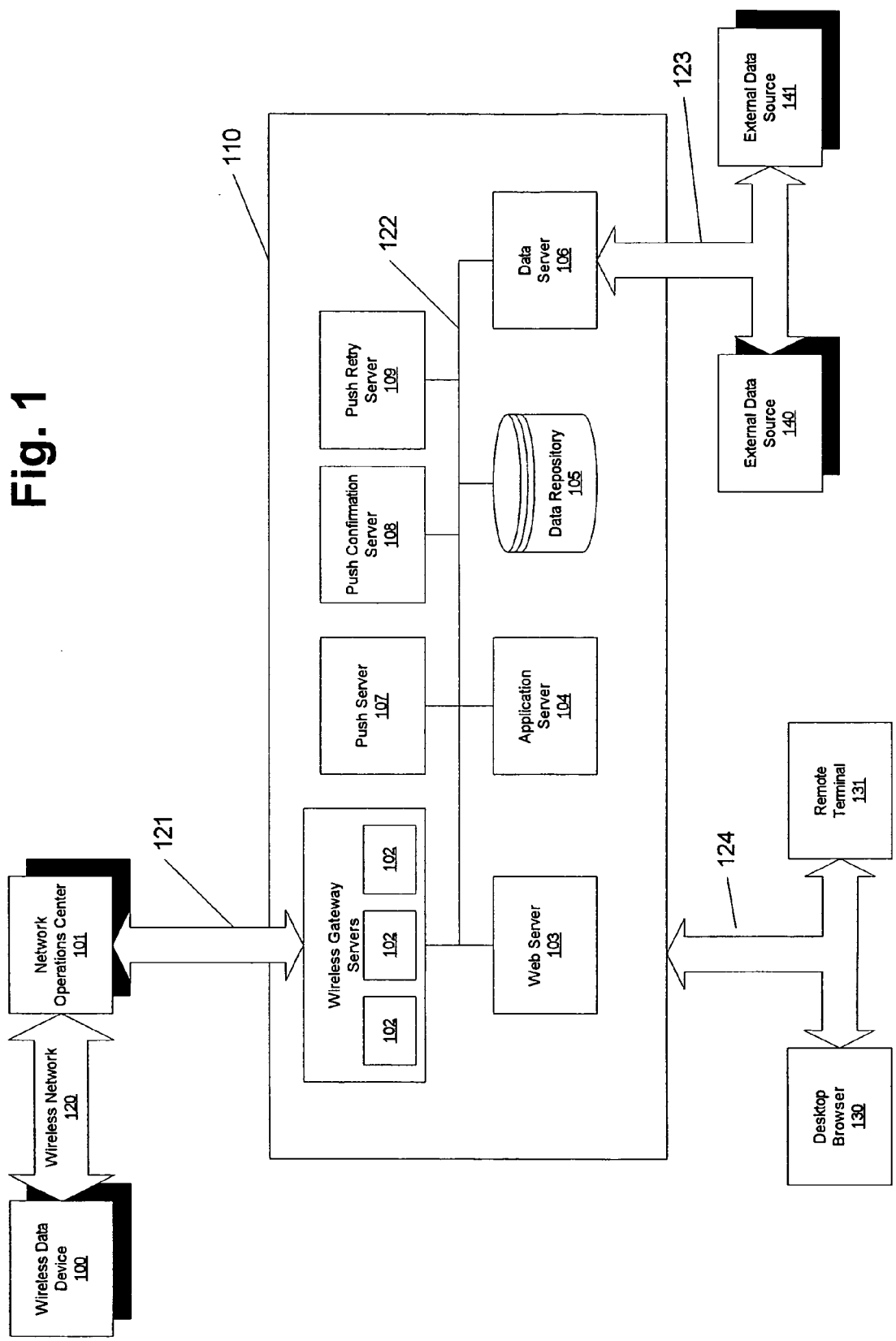
FIG. 1 is a block diagram of the functional elements of a system for sending pushed data from various computer-based systems to a wireless data device in accordance with one embodiment of the present invention.

FIG. 1 is a block diagram of the functional elements of a system 110 for sending pushed data from various computer-based systems to a wireless data device 100 in accordance with one embodiment of the present invention. The functional elements shown in FIG. 1 can be implemented with any combination of hardware or software, including software executed by multiple computer systems or servers.

System 110 includes one or more wireless gateway servers 102 that take electronic information produced by system 110 and makes it compatible for transmission across a wireless network 120 by encoding it in transmission protocols applicable to wireless network 120. Wireless gateway servers 102 communicate this electronic data to a network operations center 101 across a communications network 121. Network operations center 101 monitors and manages various computer systems which interface to a carrier's wireless network 120. The wirelessly transmitted electronic information is received and displayed by wireless data device 100.

In one embodiment, wireless data device 100 is a commercially available handheld device, and wireless gateway servers 102 are Servers executing Mobile Data Service. However, other types of commercially available wireless data devices and gateway servers can be used in different embodiments of the present invention.

System 110 further includes a Web server 103 that in one embodiment includes multiple web servers and one or more load balance servers. Web server 103 receives and interprets electronic messages encoded in various internet-compatible protocols, such as HyperText Transfer Protocol ("HTTP") or File Transfer Protocol ("FTP").

An application server 104 includes one or more application programs running on one or more application servers in a clustered environment. Application server 104 contains business rules and program logic, responds to user requests and processes and formats data in a manner consistent with wireless data device 100.

System 110 further includes a push server 107 that optimizes the use of multiple wireless gateway servers 102. In one embodiment, the number of wireless data devices 100 in communication with wireless gateway servers 102 can number in the thousands, and each are provisioned on a particular wireless gateway server 102 from the set of multiple wireless gateway servers 102. In one embodiment, the functionality of push server 107 may be provided on the same server as application server 104, or may exist on servers which are distinct from application server 104.

System 110 further includes a push confirmation server 108 and a push retry server 109. Push confirmation server 108 accepts communication requests from push server 107 to track whether the pushes that it sends are successfully delivered to wireless data device 100. In one embodiment, push confirmation server 108 runs on a separate computer server as push server 107, and communication requests between the two are done via HTTP over a communication link 122. Push confirmation server 108 includes a push confirmation parser that parses the log files of wireless gateway servers 102.

Push retry server 109 works in conjunction with push confirmation server 108 and push server 107. Push retry server 109 initiates a retry of the sending of pushed data that is not been successfully delivered, based on a lack of confirmation from push confirmation server 108.

In one embodiment, push retry server 109, push confirmation server 108 and push server 107 share a common data repository 105. Data repository 105 provides long-term data storage for system 110. The storage may take the form of relational or hierarchical databases, sequential flat file storage, or any other method that allows data to be stored and retrieved.

A data server 106 allows system 110 to interface with one or more independent external data sources 140 and 141 that provide raw data or processed information, via a communications network 123. External data source systems 140 and 141 may represent computer data systems such as 3rd party financial or market data systems, news services, or any other source of electronic data that may be transformed and represented in a wireless markup language format for display on wireless data device 100. In one embodiment, the electronic pushed data is formatted in accordance with the "Push Access Protocol" of the "Wireless Application Protocol".

A desktop computer browser 130 or remote terminal 131 is used to dynamically manage various system 110 elements via a communications link 124. These management functions can include viewing and altering configuration values for system 110 elements or viewing of diagnostic files or real-time data and statistics.

Communications networks 121, 122, 123, and 124 may be one or more hardwired digital or analog communications links, wireless digital or analog communications links, or any combination thereof, or utilize any other methods for establishing and operating communications links.

In one embodiment of system 110, data can be received by wireless data device 100 in two ways: (1) "pull", which involves the user explicitly requesting the data, for example, by clicking on a link in a microbrowser; and (2) "push", which involves the user registering to receive data to be sent in the future. With push, the data is delivered to wireless data device 100 without further intervention by the user. The data may be automatically gathered and sent on a regularly scheduled or sporadic basis or it may be published by human intervention and sent to registered users on a regular or sporadic basis.

In order for wireless data device 100 to receive pushed data in one embodiment, it must be provisioned on one of wireless gateway servers 102. The wireless gateway server 102 takes data intended for wireless data device 100 (identified by a unique number, sometimes called a "PIN") from, for example, data server 106, and forwards the data and PIN to network operations center 101. Network operations center 101 then handles transmitting the message over wireless network element 120 to the wireless data device 100 that matches the PIN.

In large corporate or government environments, there are typically multiple wireless gateway servers which make up the wireless gateway servers 102. In one embodiment, a wireless data device 100 is provisioned on a single, particular wireless gateway server, and the push server 107 must either know or determine which wireless gateway server 102 to forward a message to for a particular user's PIN. Additionally, due to network growth or management, the provisioning of wireless data device 100 on a particular wireless gateway server making up wireless gateway servers 102 may change, as well as the particular wireless gateway server names.

Figure 2:
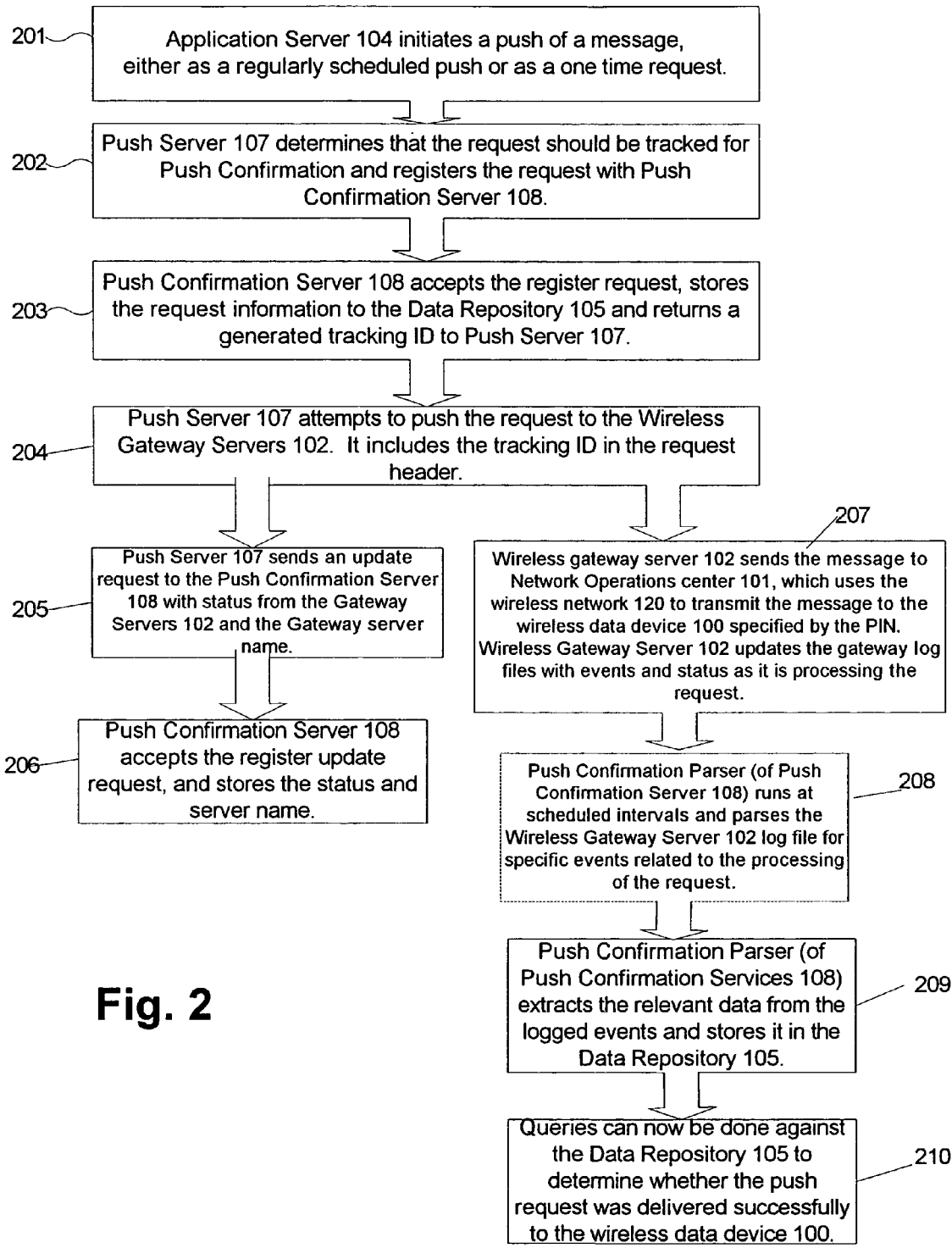
FIG. 2 is a flow diagram of the functionality performed by the system to push and then confirm delivery of data to the wireless data device in accordance with one embodiment of the present invention.

FIG. 2 is a flow diagram of the functionality performed by system 110 to push and then confirm delivery of data to wireless data device 100 in accordance with one embodiment of the present invention. In one embodiment, the functionality is implemented by software stored in memory and executed by a processor. In other embodiments, the functionality can be performed by hardware, or any combination of hardware and software.

201: Application server 104 initiates a push of data such as a document in the form of a message, either as a regularly scheduled push or as a one time request, by sending a push request to push server 107 using communications link 122.

202: Push server 107 determines that the request should be tracked for Push Confirmation and registers the request with push confirmation server 108.

203: Push confirmation server 108 accepts the register request, stores the request information in data repository 105, and returns a generated tracking identifier ("ID") to Push server 107.

204: Push server 107 attempts to push the request to wireless gateway server 102. It includes the tracking ID in the request header.

205: Push server 107 sends an update request to push confirmation server 108 with the status from gateway server 102 and the gateway server name of gateway servers 102 that is responsible for wireless data device 100.

206: Push confirmation server 108 accepts the register update request, and stores the status and server name. The server name is used by push confirmation server 108 to determine a match of the server log file with the request.

207: In parallel with 205 and 206 above, wireless gateway servers 102 sends the message to network operations center 101, which uses wireless network 120 to transmit the message to wireless data device 100 as specified by the PIN. Wireless gateway servers 102 update the gateway log files with events and status as it is processing the request.

208: Each log file of wireless gateway servers 102 is parsed by the push confirmation parser of push confirmation server 108 at regularly scheduled intervals for specific events related to the processing of the request. Push confirmation parser parses for those push events that are necessary to: (1) determine that the push was successful or failed (i.e., push status); and (2) tie the push status to the tracking ID. Each event is associated with a unique pattern in the log that is used by the push confirmation parser in finding the relevant log entries.

209: The push confirmation parser of push confirmation server 108 extracts the relevant data from the logged events and stores it in data repository 105. The relevant data from the Request Event includes any information necessary to tie the request (tracking ID) to the push status as well as timestamps for the events.

210: Queries are done against data repository 105 to determine whether the push request was delivered successfully to wireless data device 100.

Figure 3:
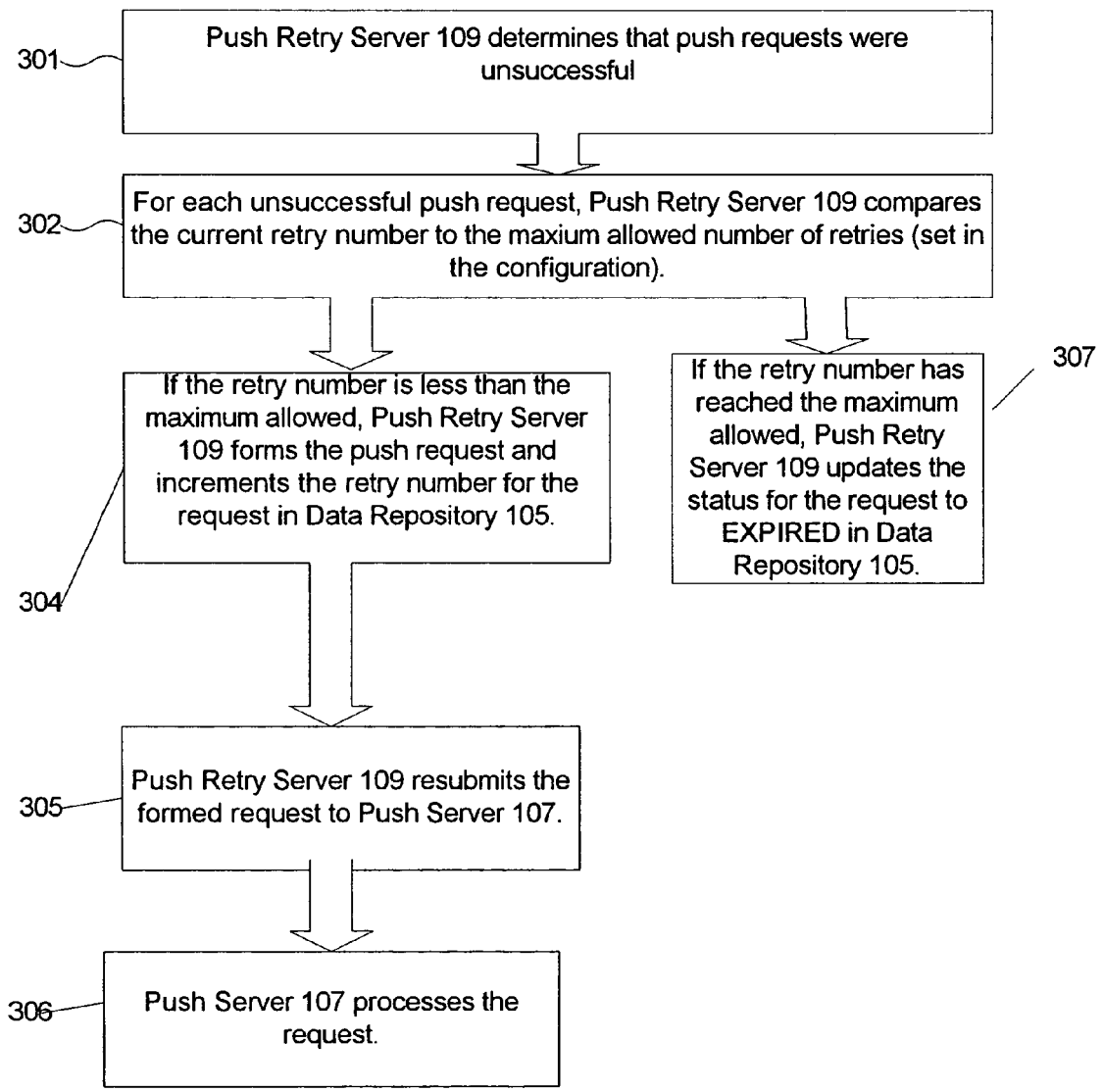
FIG. 3 is a flow diagram of the functionality performed by the system to retry the delivery of pushed data to the wireless data device in accordance with one embodiment of the present invention.

FIG. 3 is a flow diagram of the functionality performed by system 110 to retry the delivery of pushed data to wireless data device 100 in accordance with one embodiment of the present invention. In one embodiment, the functionality is implemented by software stored in memory and executed by a processor. In other embodiments, the functionality can be performed by hardware, or any combination of hardware and software.

301: Push retry server 109 determines that a push data request was unsuccessful, either by receiving a signal from push confirmation server 106 as a result of the confirmation process discussed in conjunction with FIG. 2 above, or from a query of data repository 105 after the confirmation process of FIG. 2 has completed.

302: For each request that is to be retried, push retry server 109 compares the current retry number to the maximum allowed number of retries predetermined during setup.

304: If the retry number is less than the maximum allowed, push server 109 forms the push request and increments the retry number for the request in data repository 105.

305: Push retry server 109 resubmits the formed request to push server 107.

306: Push server 107 processes the request.

307: If the retry number has reached the maximum allowed at 304, push retry server 109 updates the status for the request to EXPIRED or some other indicator of an unsuccessful delivery in data repository 105.

As described, push data requests to the wireless data device will be automatically confirmed, and if necessary retried. The result is improved reliability of pushed data by increasing efficiency and eliminating user error.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method comprising:
    generating, by a push confirmation server, a tracking identifier (ID) for a first request for pushed data;
    sending, by a push server, the first request to a wireless data device gateway server of a plurality of wireless data device gateway servers, each of the wireless data device gateway servers comprising a log file;
    generating, by the push server, an update request including the tracking ID and identifying which of the wireless data device gateway servers that the first request was directed to;
    determining, by the push confirmation server, based on the update request, the identified one of the wireless data device gateway servers;
    parsing, by the push confirmation server, the log file of the identified one of the wireless data device gateway servers to extract confirmation data based on the tracking ID; and
    determining, by the push confirmation server, whether the pushed data was successfully delivered to the wireless data device based on the confirmation data.

2. The method of claim 1, further comprising:
    storing the confirmation data in a data repository, wherein determining whether the pushed data was successfully delivered comprises querying the data repository.

3. The method of claim 1, wherein the first request comprises a header, and the tracking ID is included in the header.

4. The method of claim 1, wherein the wireless data device gateway server transmits the pushed data and an identifier of a wireless data device to a network operations center.

5. The method of claim 1, further comprising:
    if it is determined that the pushed data was not successfully delivered, sending a second request for the pushed data to the identified one of the wireless data device gateway servers.

6. The method of claim 5, further comprising:
    determining whether a maximum retry number has been reached; and
    if it is determined that the maximum retry number has been reached, updating a status of the request.

7. The method of claim 1, further comprising:
    formatting the pushed data for display on a wireless data device.

8. The method of claim 1, wherein the parsing comprises:
    determining a push status; and
    tying the push status to the tracking ID.

9. The method of claim 1, further comprising determining whether the pushed data is to be tracked, wherein said generating the tracking ID is performed responsive to determining that the pushed data is to be tracked.

10. The method of claim 1, wherein said parsing comprises periodically parsing the log file of the identified one of the wireless data device gateway servers.

11. A method, comprising:
    determining whether pushed data is to be tracked;
    responsive to determining that the pushed data is to be tracked, generating, by a push confirmation server, a tracking identifier (ID) for a first request for the pushed data;
    sending, by a push server, the first request to a wireless data device gateway server of a plurality of wireless data device gateway servers, each of the wireless data device gateway servers comprising a log file;
    generating, by the push server, an update request including the tracking ID and identifying which of the wireless data device gateway servers that the first request was directed to;
    parsing, by the push confirmation server, the log file of said identified one of the wireless data device gateway servers to extract confirmation data based on the tracking ID; and
    determining, by the push confirmation server, whether the pushed data was successfully delivered to the wireless data device based on the confirmation data.

12. The method of claim 11, further comprising:
    storing the confirmation data in a data repository, wherein said determining whether the pushed data was successfully delivered comprises querying the data repository.

13. The method of claim 11, wherein the first request comprises a header, and the tracking ID is included in the header.

14. The method of claim 11, further comprising:
    if it is determined that the pushed data was not successfully delivered, sending a second request for the pushed data to said wireless data device gateway server.

15. The method of claim 11, further comprising:
    determining whether a maximum retry number has been reached; and
    if it is determined that the maximum retry number has been reached, updating a status of the first request.

16. A system, comprising:
   a push confirmation server configured to, responsive to determining that pushed data is to be tracked, generate a tracking identifier (ID) for a first request for the pushed data; and
   a push server configured to send the first request to a wireless data device gateway server of a plurality of wireless data device gateway servers, each of the wireless data device gateway servers comprising a log file, and to generate an update request including the tracking ID and identifying which of the wireless data device gateway servers that the first request was directed to;
   wherein the push confirmation server is further configured to:
      parse the log file of the identified one of the wireless data device gateway servers to extract confirmation data based on the tracking ID, and
      determine whether the pushed data was successfully delivered to the wireless data device based on the confirmation data.

17. The system of claim 16, further comprising a data repository, wherein the push confirmation server is further configured to store the confirmation data in the data repository, and wherein the push confirmation server is further configured to determine whether the pushed data was successfully delivered based on a query to the data repository.

18. The system of claim 16, wherein the first request comprises a header, and the tracking ID is included in the header.

19. The system of claim 16, wherein the push confirmation server is further configured to:
   if it is determined that the pushed data was not successfully delivered, send a second request for the pushed data to said wireless data device gateway server.

20. The system of claim 16, further comprising a push retry server configured to:
   determine whether a maximum retry number has been reached; and
   if it is determined that the maximum retry number has been reached, update a status of the first request.

21. A method comprising:
   a push confirmation server configured to generate a tracking identifier (ID) for a first request for pushed data; and
   a push server configured to:
      send the first request to a wireless data device gateway server of a plurality of wireless data device gateway servers, each of the wireless data device gateway servers comprising a log file, and
      generate an update request including the tracking ID and identifying which of the wireless data device gateway servers that the first request was directed to,
   wherein the push confirmation server is further configured to:
      determine, based on the update request, the identified one of the wireless data device gateway servers
      parse the log file of the identified one of the wireless data device gateway servers to extract confirmation data based on the tracking ID, and
      determine whether the pushed data was successfully delivered to the wireless data device based on the confirmation data.

22. The system of claim 21, further comprising a data repository, wherein the push confirmation server is further configured to store the confirmation data in the data repository, and wherein the push confirmation server is further configured to determine whether the pushed data was successfully delivered based on a query to the data repository.

23. The system of claim 21, wherein the first request comprises a header, and the tracking ID is included in the header.

24. The system of claim 21, wherein the push confirmation server is further configured to:
   if it is determined that the pushed data was not successfully delivered, send a second request for the pushed data to said wireless data device gateway server.

* * * * *